US006606849B1

(12) United States Patent
Salter et al.

(10) Patent No.: US 6,606,849 B1
(45) Date of Patent: Aug. 19, 2003

(54) EXTERNAL COMBUSTION ENGINE

(75) Inventors: Stephen Hugh Salter, Edinburgh (GB); William Hugh Salvin Rampen, Edinburgh (GB); Uwe Bernhardt Pascal Stein, Edinburgh (DE)

(73) Assignee: New Malone Company Limited, Edinburgh (GB)

( * ) Notice: Subject to any disclaimer, the term of this patent is extended or adjusted under 35 U.S.C. 154(b) by 47 days.

(21) Appl. No.: 10/019,603

(22) PCT Filed: Jun. 29, 2000

(86) PCT No.: PCT/GB00/02496

§ 371 (c)(1),
(2), (4) Date: Mar. 1, 2002

(87) PCT Pub. No.: WO01/02715

PCT Pub. Date: Jan. 11, 2001

(30) Foreign Application Priority Data

Jul. 1, 1999 (GB) ............................................ 9915430

(51) Int. Cl.[7] ................................................ F02C 5/00
(52) U.S. Cl. ............................ 60/39.6; 60/524; 60/526
(58) Field of Search ......................... 60/39.6, 517, 524, 60/526

(56) References Cited

U.S. PATENT DOCUMENTS 3,090,702 A * 5/1963 Commanday et al. ...... 148/279
4,010,621 A * 3/1977 Raetz .............................. 62/6
4,366,676 A * 1/1983 Wheatley et al. ........... 505/895
4,404,802 A * 9/1983 Beale .......................... 60/517
5,022,229 A * 6/1991 Vitale .......................... 60/517

FOREIGN PATENT DOCUMENTS

DE 3305253 * 8/1984
EP 0361927 * 4/1990

OTHER PUBLICATIONS

G. Walker, Working Fluids in Stirling Engines, 1987, XP–002148030.*

* cited by examiner

*Primary Examiner*—Hoang Nguyen

(57) ABSTRACT

An external combustion engine (1) comprising pressure vessel means defining a tubular working chamber (3) having spaced apart first and second ends and including first wall means (11), adjacent the first end of the chamber, heated by heating means (10, 11) and second wall means (6), adjacent the second end of the chamber, cooled by cooling means. The engine further has a porous piston or regenerator (7) provided with heat exchanging means (9) and movable within the tubular working chamber (3) between the first and second ends of the chamber so that the working fluid passes through the heat exchanging means. The regenerator (7) has valving means.

25 Claims, 8 Drawing Sheets

EXTERNAL COMBUSTION ENGINE

TECHNICAL FIELD

This invention relates to an external combustion engine of the kind comprising pressure vessel means defining a tubular working chamber having spaced apart first and second ends and including first wall means adjacent said first end of the chamber and second wall means adjacent said second end of the chamber, heating means for heating said first wall means, cooling means for cooling said second wall means, piston means having heat exchanging means and drive means for reciprocating the piston means within the tubular working chamber between said first and second ends of the chamber so that the working fluid passes through said heat exchanging means.

BACKGROUND ART

Most Stirling engines operate on the principle of expansion and contraction of a contained gaseous working fluid moving between two different temperature levels. Although Stirling engines have certain advantages compared with other heat engines, they face problems regarding sealing of the working fluid, e.g. hot hydrogen, and power control. In the 1920s, Malone proposed in U.S. Pat. No. 1,487,664 and U.S. Pat. No. 1,717,161 modifications to the basic design of Stirling engine which used, instead of gas as the working fluid, water which varied in condition between liquid and super-critical. The Malone engines needed to operate at high pressures and consequently provided high power densities. However, since the work by Malone, very little work has been undertaken to further develop the Malone engine. The only significant development in the Malone cycle has been in refrigeration and heat pumps.

The basic configuration of a known Malone engine comprises a thermodynamic pressure vessel (or “TD pile”) in the form of a long tube with opposite extremes of temperature applied to its opposite ends. The hot end is exposed to a heat source, such as a flame or heat storage material, whilst the cold end has a cooling jacket able to remove heat from the pile and transfer it to the cooling fluid, which is circulated through the jacket. Between these extremes of position and temperature inside the TD pile, is a porous piston which.is both a regenerator and displacer (hereinafter referred to as a regenerator). The regenerator is mechanically driven from end to end within the pile following a sinusoidal motion. As the regenerator is moved, fluid is forced through its core matrix, in the process exchanging heat between the matrix and the fluid. The displacement of fluid away from each end alternately reduces the mass of fluid available to either accept or give up heat.

Due to the forced motion of the regenerator and the cyclically varying ingress and egress of heat, there is a variation of pressure and volume of the fluid within the TD pile which can be harnessed to create mechanical work. It is also known to connect a piston to the cold end, which can allow the working volume to expand whilst at high pressure and then contract at reduced pressure, thereby forming an interface between fluid and mechanical power. More specifically, it has been proposed to provide a digital-displacement hydraulic pump/motor of the kind disclosed in EP-A-0494236 for controlling the working volume of the TD pile.

DISCLOSURE OF THE INVENTION

The present invention seeks to provide improvements in the basic components of an external combustion engine of the kind referred to.

According to one aspect of the present invention an external combustion engine of the kind referred to is characterised in that said first wall means has first heat exchange surface means and in that said piston means has valving means including first valve means positionable for directing the working fluid, after passage through said heat exchanging means, to flow over said first heat exchange surface means when the piston means is moving towards said second end of the chamber in order to move the working fluid from the second end to the first end of said chamber and to by-pass said first heat exchange surface means when the piston means is moving towards said first end of the chamber in order to move the working fluid from the first end to the second end of said chamber.

According to another aspect of the present invention there is provided an external combustion engine as claimed in the ensuing claim 20.

According to further aspect of the present invention there is provided an external combustion engine as claimed in the ensuing claim 23.

According to a still further aspect of the present invention there is provided an external combustion engine as claimed in the ensuing claim 24.

BRIEF DESCRIPTION OF DRAWINGS

Embodiments of the invention will now be described, by way of example only, with specific reference to the accompanying drawings, in which.

MODES FOR CARRYING OUT THE INVENTION

Figure 1:
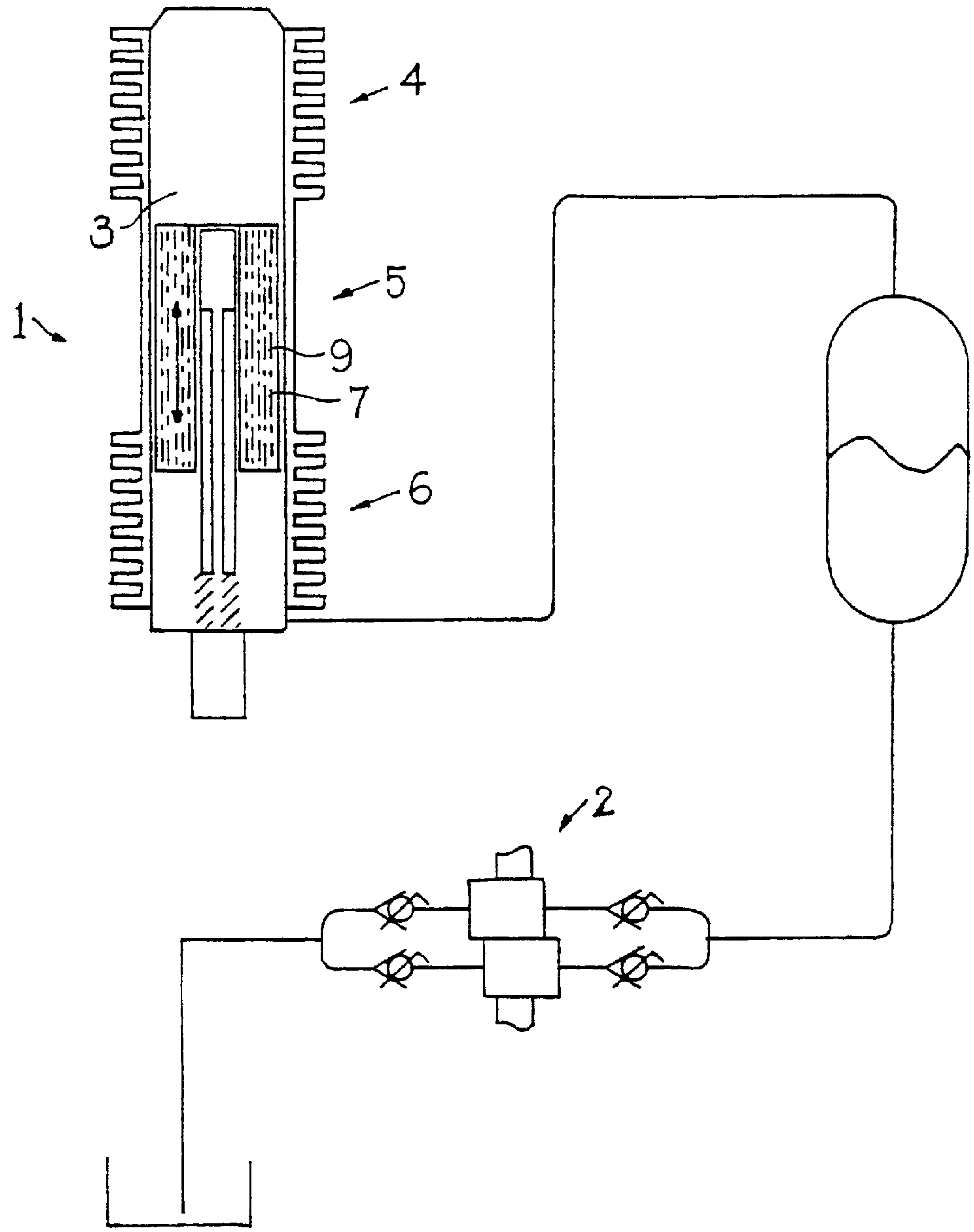
FIG. 1 is a schematic drawing of the main components of a heat engine system including an external combustion engine according to the present invention.

FIG. 1 shows a heat engine system comprising a so-called Malone engine, according to the present invention, generally designated 1, and a digital displacement pump/motor and regenerator drive, generally designated 2, for the engine 1.

Figure 2:
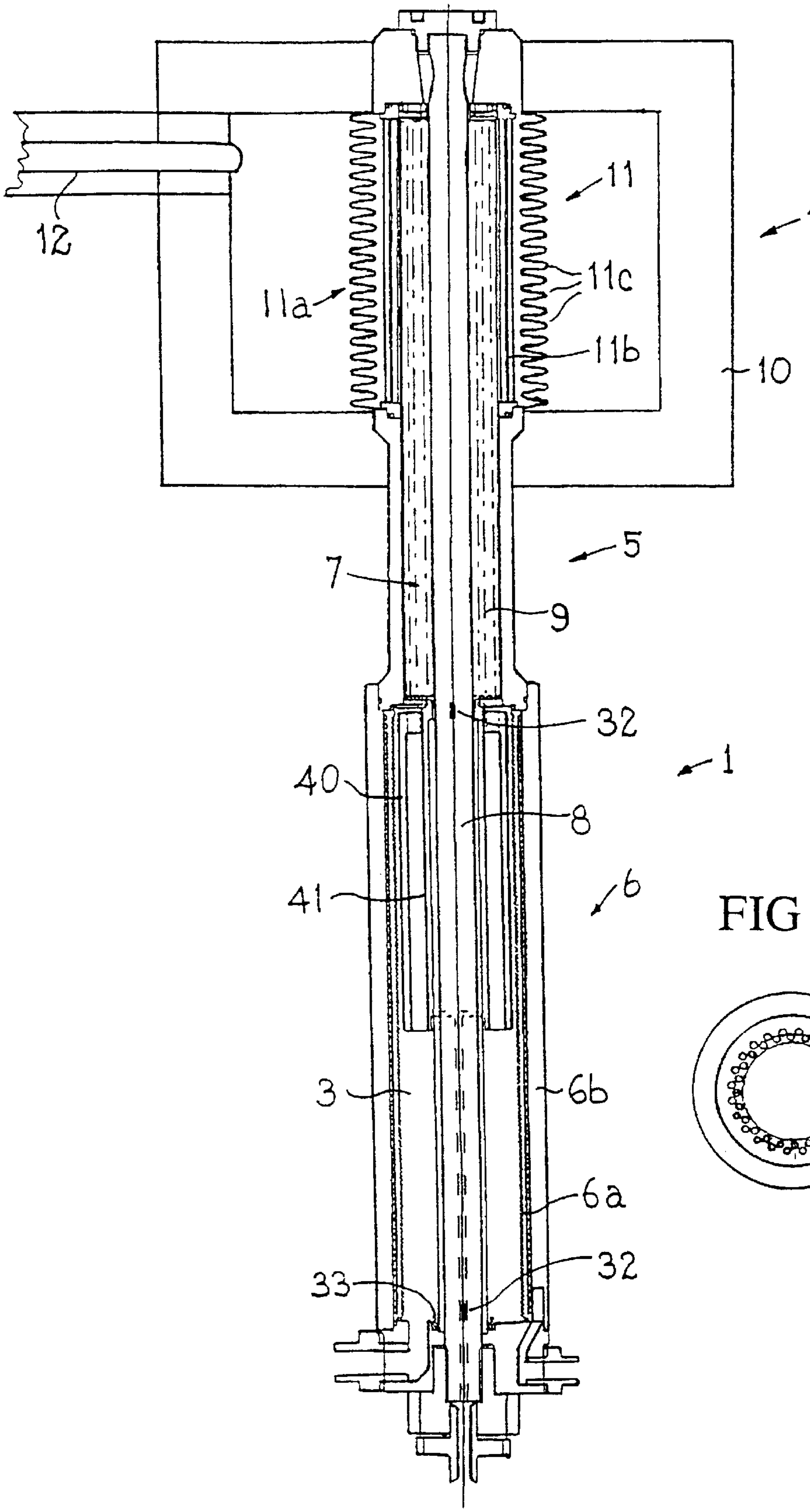
FIG. 2 is a sectional view showing schematically, but in more detail, the external combustion engine of FIG. 1.
Figure 3:
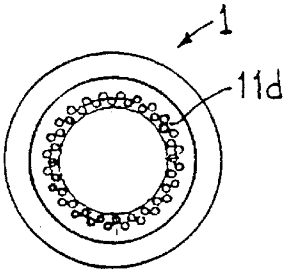
FIG. 3 is a sectional view of a hot end of the engine shown in FIG. 2.
Figure 4:
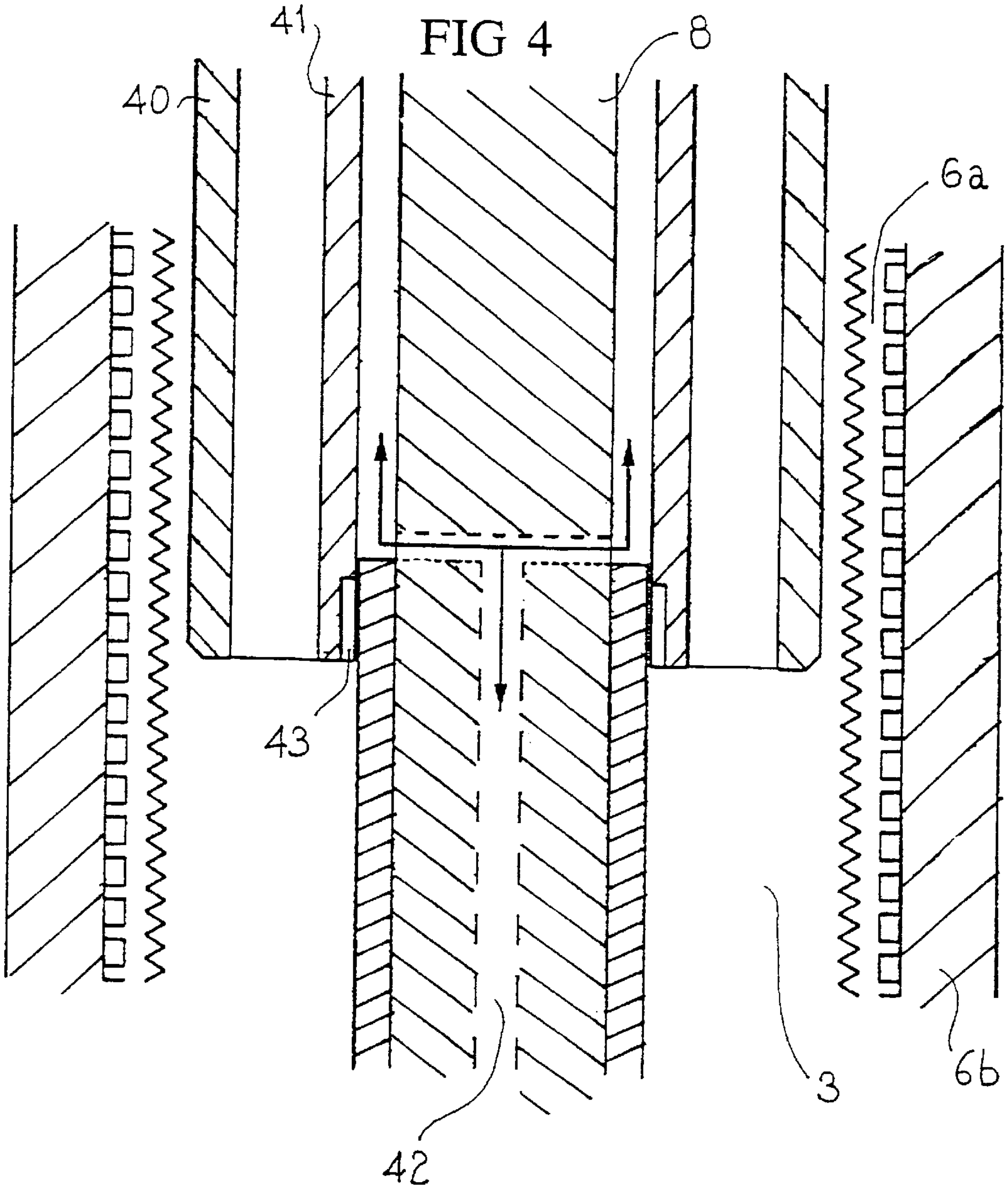
FIG. 4 is a schematic sectional view on an enlarged scale of a middle portion of a cold end of the engine shown in FIG. 2.

The engine 1 is shown schematically in FIG. 1 and is shown in more detail in FIGS. 2–4, 5*a*, 5*b*, 6*a*, 6*b* and 7. As can be seen in FIG. 2, the engine 1 comprises an upper portion 4 defining the "hot-end" of the engine, an intermediate portion 5 and a lower portion 6 defining the "cold-end" of the engine. A piston means or regenerator 7 is movable axially within a tubular working chamber 3 of the engine 1. The regenerator has a "porous" matrix or core 9 (shown schematically in chain lines in the Figures) for allowing fluid flow therethrough whilst also serving to move fluid within the working chamber 3 on movement of the regenerator within the working chamber. A central tie-rod 8 is positioned along the axis of the chamber 3.

The upper portion 4 of the engine comprises a combustion chamber 10 enclosing a finned heat exchanger, generally designated 11, having an outer portion 11*a* with fins 11*c* and an inner portion 11*b* provided with passages lid for the flow of working fluid, e.g. water or steam, therethrough. These flow passages lid provide heat exchange surfaces and extend from one end to the other of the heat exchanger 11 and may, typically, be longitudinally or spirally arranged. A burner 12 is mounted in a wall of the combustion chamber for heating the finned portion 11*a*.

The hot-end of the engine 1 differs from the original Malone design in a number of respects. The small working fluid flow passages 11*d* in the inner portion 11*b* have been created to provide much greater heat exchange area. The motion of the regenerator 7, as it descends toward the cold-end, forces super-critical steam through these passages 11*d* at high velocity to further increase heat transfer as shown schematically in FIG. 7. The passages 11*d* can be made in a number of ways. They can be circular and of very small bore; they can be of larger bore but contain rods of circular or polygonal cross-section, which serve to reduce the core volume and force the flow to the outer walls. The passages can also be formed from rectangular slots of an extreme aspect ratio. Although not apparent from the drawings, the top and bottom ends of these passages, at the extremes of the hot-end, are joined, as required, to cause multiple traverses of the heating fluid along the length of the inner portion 11*b*. Typically these passages provide three end-to-end journeys before the steam is released at the top of the hot-end into the core volume.

The materials of the hot-end heat exchanger 11 have been changed from the cast-steel initially used by Malone. Several constructions are proposed. A machined or cast finned cylinder, with steam passages as described, made from Monel alloy has the advantages of being of a single corrosion resisting material. Monel, unlike other nickel-based alloys, has the unusual property of an improving coefficient of heat transfer coefficient with rising temperature.

Figure 8:
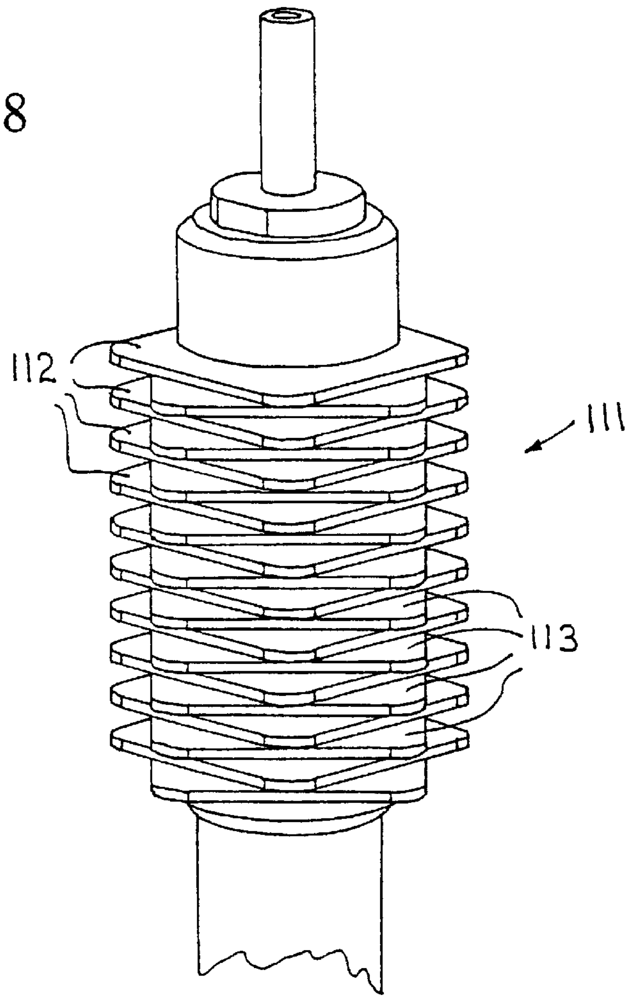
FIGS. 8 and 9 are a schematic perspective view and a schematic view from above, respectively, of a hot end of another embodiment of an external combustion engine according to the invention.
Figure 9:
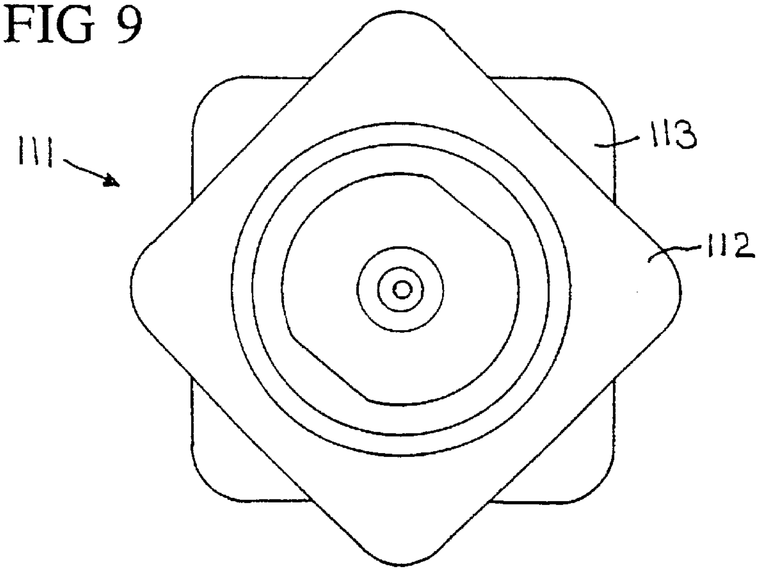

Instead of forming the heat exchanging fins 11*c* as an integral unit (as shown, for example, in FIGS. 5*a* and 5*b* and 7), the hot-end heat exchanger constructions can, for example, be formed of fins in the form of "washers" or "laminations" arranged in a stack to provide efficient heat exchanging surfaces. The stack of washers-like fins can be made of alternately arranged large and small "washers", of differing outside dimensions, on a tubular core. The fins may typically have a non-circular plan shape to enhance their heat transfer. Corners and spikes in the plan profile of the larger washers can be designed to protrude into the turbulent gas flow of the combustion chamber in order to increase heat transfer into the metal. Non-circular fins can be stacked in a non-aligned fashion to maximize exposure to turbulent gases. FIGS. 8 and 9 schematically illustrate a typical hot end heat exchanger 111 having a first set of generally square fins 112 with rounded corners and a second set of fins 113 also of generally square shape and with rounded corners which are interleaved with the fins 112. The fins 112 are all similarly orientated as are the fins 113. However the similarly orientated fins 112 are offset 90° from the similarly orientated fins 113.

The fins 11*c* (or 112 and 113) can be made of Monel Metal (an alloy of copper, nickel and small amounts of iron, manganese, silicon and carbon) or a refractory metal, such as molybdenum or tungsten, having a significantly higher thermal conductivity. The oxidation problem commonly experienced by these refractory metals can be prevented through the use of a molybdenum disilicide coating with boron diffused into it, as per the Durak B process developed by Commanday and described in U.S. Pat. No. 3,090,702.

The fins 11*c* (or 112 and 113) form the stressed portion of the hot-end of the engine 1. They effectively contain the tubular inner portion 11*b* which is suitably made of high-conductivity copper. The copper inner portion 11*b* is enveloped by high-hot strength material and thus prevented from extruding or creeping. The inner portion 11*b* is suitably made of two annular tubes which are diffusion bonded to create a single part. Prior to bonding, slots and passages are machined or formed on the outer surface of the inner tube and/or the inner surface of the outer tube for the purposes of conducting the steam as outlined above for the single piece hot-end.

The lower portion 6, defining the cold-end, includes a copper sleeve 6*a* having extended inner and outer heat exchange surfaces forming the inner wall of a cooling water jacket and an outer sleeve 6*b* forming the outer wall of the cooling water jacket.

The construction of the regenerator follows the practice outlined by Swift, of Los Alamos National Laboratories (see "Simple Theory of a Malone Engine", 24th Inter-Society Energy Conversion Engineering Conference, 1989, Paper No 899055, pp 2355–2361) and has a "porous" matrix or core 9 formed from a dimpled scroll of very thin austenitic stainless steel sheet. The scroll provides a heat exchanger with large amounts of surface area, yet minimum resistance to longitudinal flow. A further improvement on Swift is to cleave or cut the sheet across the direction of flow in short lengths of perforation before rolling it flat once again, prior to dimpling and then winding the cut and dimpled sheet into a helical coil. The cross-wise cuts interrupt the axial flow of heat through the metal of the regenerator matrix or core and thus significantly reduce the parasitic conductive heat loss through this component. The frequent sharp edges cause interruptions in the boundary layer and incite turbulence, which improves heat transfer.

Figure 5B:
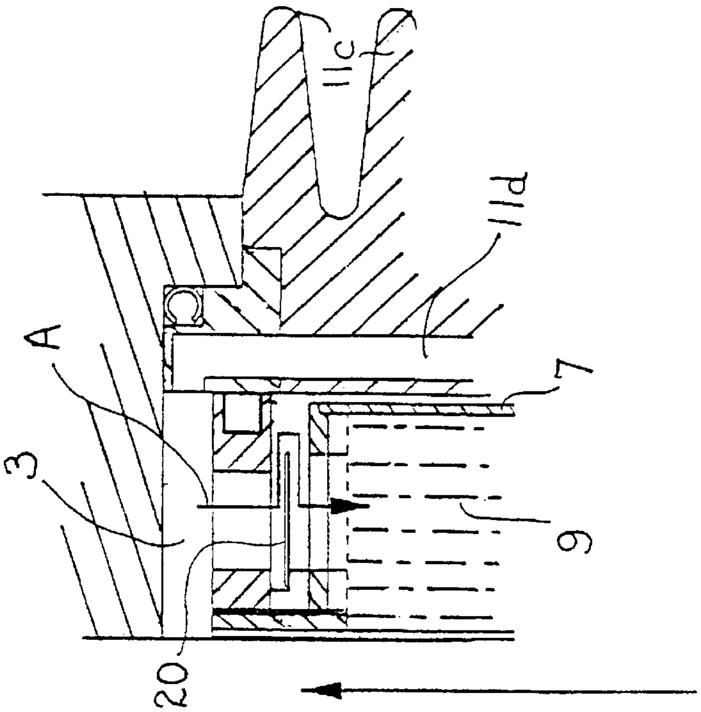
FIGS. 5*a* and 5*b* are schematic sectional views of parts of the upper part of the hot end of the engine of FIG. 2 showing working fluid flows at the top of the regenerator of the engine as the regenerator moves, respectively, downwardly from, and upwardly into, an uppermost position.
Figure 5A:
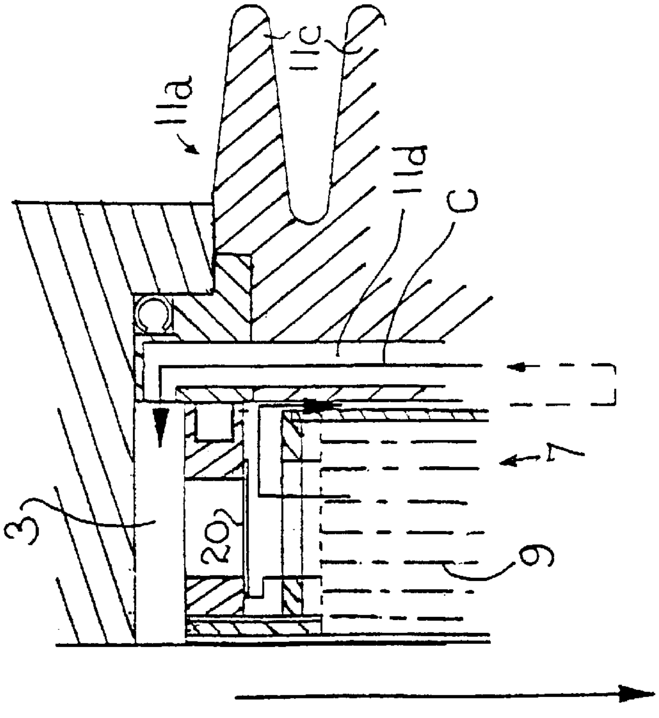
Figure 6B:
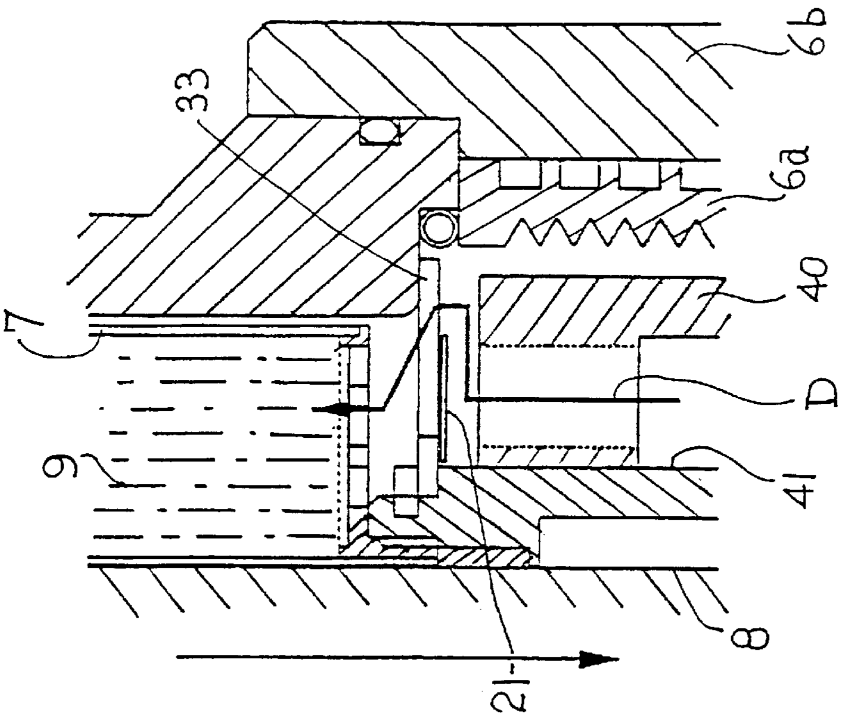
FIGS. 6*a* and 6*b* are schematic sectional views of parts of the engine of FIG. 2 showing working fluid flows at the bottom of the regenerator of the engine as the regenerator moves, respectively, upwardly into, and downwardly from, an uppermost position.
Figure 6A:
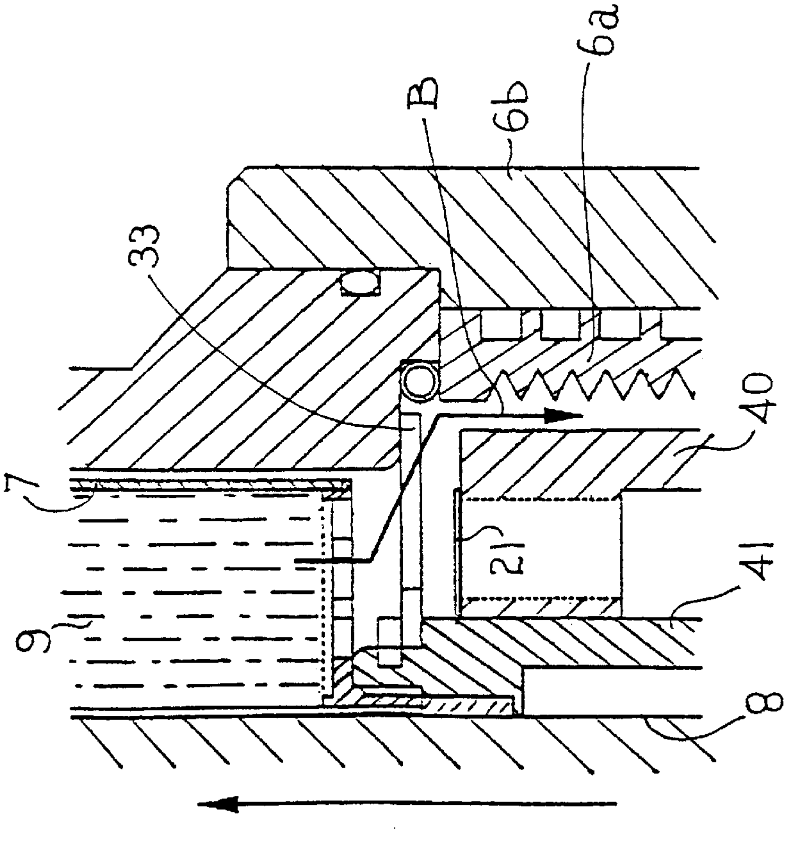
Figure 7:
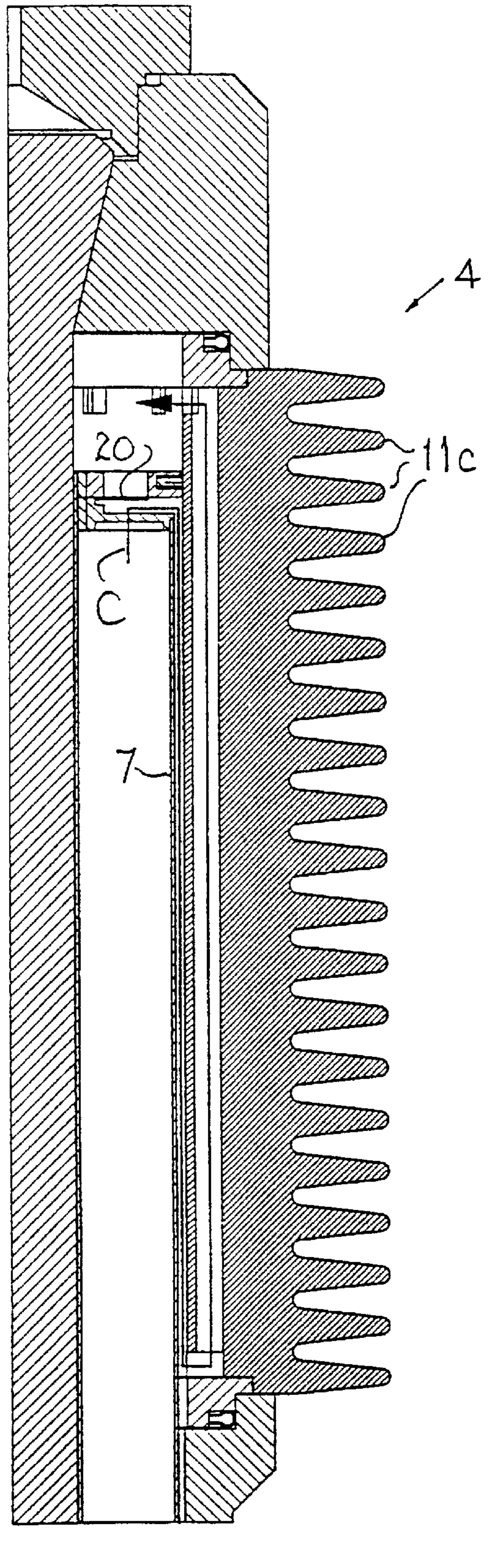
FIG. 7 is a schematic sectional view of the hot end of the engine showing fluid flows during movement of the regenerator towards the cold end.

In the original Malone engine, valves were used in the regenerator in order to create a non-returning flow through the regenerator matrix or core. In the present design, valves 20, 21 are used at each end of the regenerator 7, as well, but for a different reason. The valves 20, 21 are check valves to allow the flow of working fluid to bypass the heat-exchange surfaces of the hot and cold ends during the portion of the stroke that their effect is not desired. When the regenerator 7 is ascending into the hot-end, forcing fluid through its matrix and over a cold end dummy 40, it is desired to maximise the heat rejected, to keep the working pressure low and to reset the virtual piston to top-dead-centre. This is achieved, as shown in FIGS. 5*b* and 6*a*, by check valve 20 being open and check valve 21 being closed. As the regenerator 7 moves upwardly (with the cold end dummy 40), the open check valve 20 causes the working fluid to flow through the core 9 of the regenerator 7 (see arrow A in FIG. 5*b*) and the closed check valve 21 causes the working fluid to pass over the cold end dummy against the heat exchange surfaces of the inner sleeve 6*a* (see arrow B in FIG. 6*a*). The open check 35, valve 20 at the top of the regenerator allows the steam trapped in the core volume of the pile to return directly into the regenerator matrix or core 9 without passing through the longitudinal passages 11*d* in the hot-end wall and picking up unnecessary heat.

On the reverse or downward stroke (see FIGS. 5*a* and 6*b*), the check valve 21 in the cold-dummy 40 is open and the check valve 20 is closed. The open check valve 21 allows water to pass directly into the regenerator matrix or core (arrow D) without being forced against the sleeve 6*a* of the cold-end at high velocity and rejecting heat unnecessarily. The closed check valve 20 forces steam to flow through the passages 11*d* as shown by arrow C in FIG. 5*a*.

The longitudinal force induced by the internal pressure within the working chamber 3 of the TD pile is restrained by the internal tie rod 8, which is conveniently made of nickel super-alloy. The siting of the rod 8 along the axis of the TD pile achieves three objectives. Firstly, it isolates the tie rod from the extremely hot combustion gases, thus allowing it to be relatively slender. Secondly, for a given TD pile volume, it occupies the inner core or working chamber 3 where heat exchange is limited and forces a slightly larger outside diameter with a consequent growth in heat exchange surface. Lastly, it provides the basis of a single-acting hydraulic ram which can be used to drive the regenerator.

Figure 10:
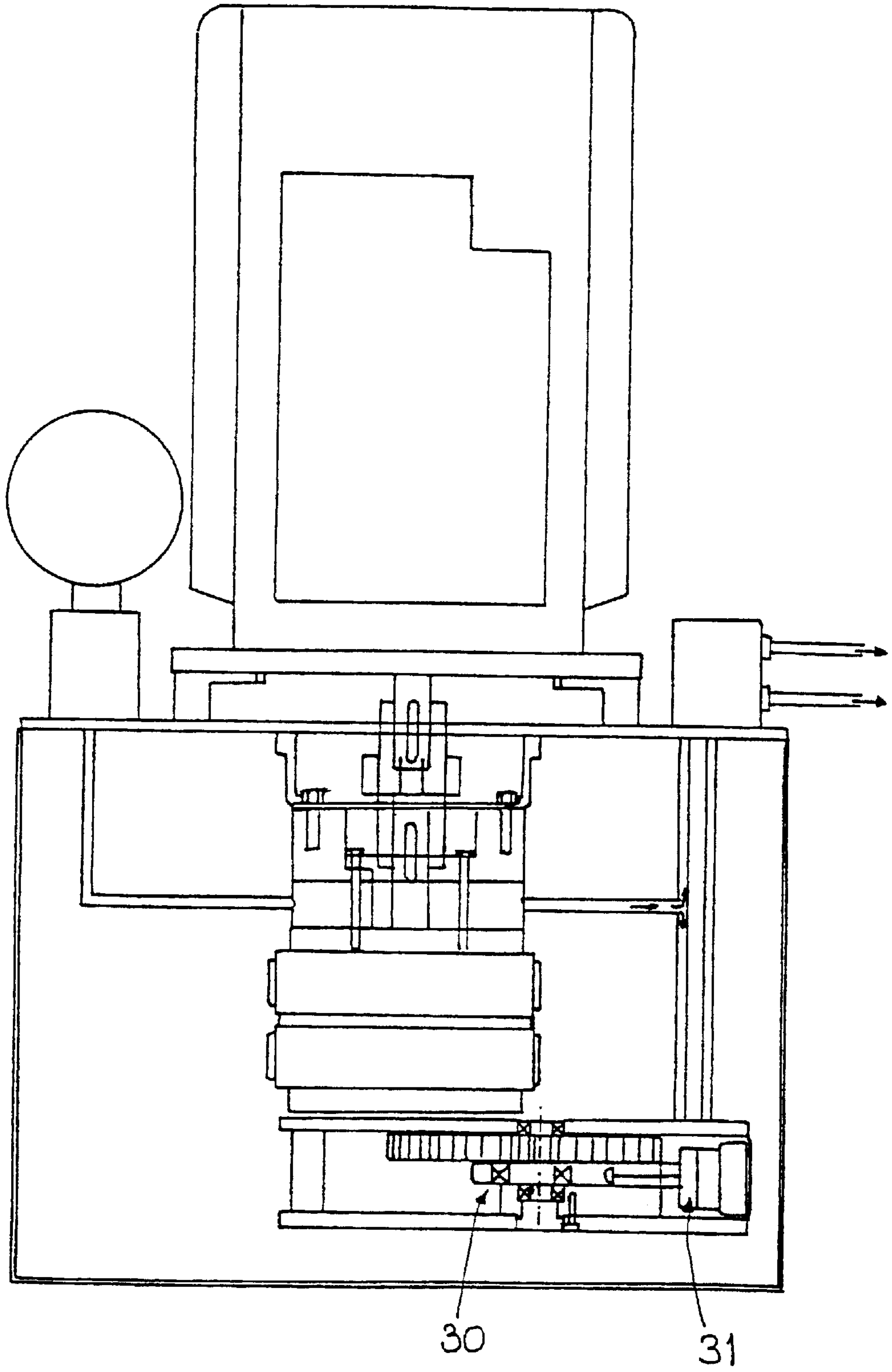
FIG. 10 is a schematic view of a, digital displacement pump/motor and regenerator drive for the heat engine system shown in FIG. 1.

The motion of the regenerator 7 is created by a rotating eccentric 30 (see FIG. 10) which transfers power to the working chamber 3 via a hydraulic master/slave cylinder system. The eccentric 30 rotates in a speed range from one fifth to one tenth the speed of the fluid power machine 2 and might be directly geared to its drive shaft for synchronisation purposes. The master cylinder 31 creates a near-sinusoidal flow of fluid which, when linked to the slave cylinder 41 of the regenerator 7 via flow passages 42 (see FIG. 4) in the tie rod 8, forces the fluid to oscillate longitudinally within the working chamber. Sliding seals which could cause leakage are eliminated through this fluid connection. A seal 43 is provided for sealing the lower end of the cylinder 41 against, the circumferential surface of the tie rod 8.

The master cylinder 31 pumps a lubricious fluid, such as oil, and so an isolating diaphragm must be introduced to separate the oil from the working fluid of the working chamber 3. The master and slave cylinders will themselves suffer small degrees of leakage and therefore require a mechanism for refilling the system during operation. By exposing a port on the side of the master cylinder when the piston reaches bottom-dead-centre, the oil side of the system can make up losses, though at the cost of introducing a small flat-spot on the sinusoidal flow curve. On the working fluid side of the isolator, small bleed ports 32 can be exposed when the regenerator 7 exceeds the prescribed motion. End-of-travel springs 33 can be used to restrain the regenerator while these ports are open and active. The slight variations in the motion introduced by these dwell periods can be compensated by controlling the fluid-power machine's flow function to minimise their effect on the desired PV diagram.

The connection between the TD pile working volume, i.e. the working chamber 3, and the fluid-power machine 2 similarly requires an isolator, due to the strong preference of operating the pump/motor with lubricious fluid. As the TD pile has only two fluid connections and no sliding mechanical ones, problems of sealing, typical to many forms of Stirling engine, are eliminated. As with the regenerator drive system, accumulated leakage on the oil side of the pump/motor can be made up by occasionally pumping an extra stroke to restore the required pressure.

Two autonomous control systems are used to regulate the engine, each having the objective of allowing rapid changes in output power. Starting with the combustion air, a blower induces atmospheric air into the burner 12 where it is combined with liquid or gaseous fuel. The fuel flow rate is controlled by a mechanical proportioning valve which is sensible to the pressure or flow rate of the combustion air. By this means, a consistent air to fuel ratio is maintained. The burner 12 combusts the mixture and the resulting high-velocity hot gases impinge on the exterior of the heat exchanger at the hot-end. A temperature sensor, such as a thermocouple, feeds back hot-end temperature to a PID controller. The controller regulates temperature by varying the speed of the blower impeller, through the use of an inverter drive, and thus the mass-flow rate of the combustion gases. The thermal mass of the system is relatively high and the consequent time constant of the combustion control system long.

The regenerator is driven with a constant sinusoidal motion of unvarying amplitude and cycle speed. The pump/motor 2 also operates at constant speed but the flow function demanded of it is continuously varied to allow for rapid changes in power demand. The primary means for changing power level is to offset the virtual power-piston to increase or reduce the mean operating pressure level of the TD pile.

The flow function required of the pump/motor 2 cannot readily be delivered by following an analogue demand signal, due to the inherent time delay between sensing and pumping. Instead, the primary method of control is to load look up tables of cylinder enabling events to be followed during each thermodynamic cycle. The number of tables required corresponds to the number of cylinders which need to be pumped to bias the cycle from the lowest mean pressure, at which the engine will operate, to the highest mean pressure, which can be accommodated by the TD pile structure. Typically there will be between five and ten cylinder increments. Each power level requires a distinct, tuned table. The change from one power level to another is effected by using transition tables, which allow a useful cycle to be created whilst also returning the virtual power piston to its required place for the beginning of the next cycle. Analogue control can be superimposed over a portion of the table to restore the virtual piston position, in the event of an unforeseen event or, as a result of accumulated leakage on either side of the isolator diaphragms.

As all engine power is transferred into a rotating shaft running at constant speed, some degree of output buffering can be supplied by the inertia of the rotating group and load, as would be the case if it directly drove an electrical generator. In, the case where the engine is supplying a variable speed load, further services can be incorporated on.the shaft of the pump/motor, by adding more banks, to provide a controllable flow which can drive a hydraulic motor, or linear ram, at the desired speed. Any short term mismatch between load power demand and engine power generation can be compensated by adding another service to the pump/motor stack which can be directly connected to a gas accumulator, for energy storage. In this way large, but controllable, energy transfer rates can be effected between the load and the buffering accumulator. The isolation provided by the crankshaft allows both services to remain at the pressures demanded of them by their respective masters.

The engine is started by firing the burner 12, to establish the temperature differential across the TD pile or working chamber 3. The pump/motor and regenerator motions are then established, by means of either an electric motor or a gas-accumulator driving one of the pump/motor services, to commence the cycle. It is possible to imagine, in the case of a vehicle, that the regenerator drive would be de-clutched during warm-up and that the vehicle would be driven by stored energy in the accumulator while proper operating temperatures were established within the TD pile.

In the process of a single cycle, the relative heat and work flows are approximately in the following ratio: two parts heat in, via the hot-end wall, eight parts stored and then released from the regenerator matrix, one part rejected to the cooling water and one part converted to mechanical work.

The basic components and function of the heat engine system described are very similar to the well known Beta configuration Stirling engine. As with Malone's engine, the improved version can operate with a multiplicity of TD piles. It is envisaged that significant benefit will be gained by having at least two running anti-phase.

The most radical change to Malone's design lies in exchanging the power piston, which ran at the same cyclical rate as the regenerator motion, with a high-speed digitally controlled fluid-working machine. Typically such a machine is of the type disclosed in EP-B-0494236 and has a shaft speed perhaps ten times faster. The fluid machine can reuse its working volume many times during each thermodynamic cycle. Through high-speed control of the displacement of the fluid machine it is possible to create non-sinusoidal volume variations in the working volume of the TD pile. This novel control allows the Pressure-Volume diagram of the thermodynamic cycle to be adjusted at will on both an instantaneous basis and on a cycle by cycle basis.

The instantaneous control allows the working volume expansion rate to be controlled such that the maximum system pressure remains within a range which ensures the longevity of the highly stressed hot-end (which is constantly at red-heat). The cycle by cycle control allows the volume of the working fluid to be increased and decreased by effectively off-setting the motion of the; virtual power-piston (this is the motion that would be experienced by a sliding piston in the cold-end of the TD-pile following the fluid). This offset produces a variation in the range of cyclical pressures and, therefore, a variation in the area contained within the P-V diagram which corresponds to a variation in cyclical energy and continuous power.

The following is a list of features considered to be novel in the design of an external combustion engine according to the present invention or to a heat engine system incorporating such an engine.

1. An external combustion engine with a fluid power machine, capable of arbitrary flow functions and regeneration, employed as a means of creating a controllable variable volume in the working space of the engine.
2. A heat exchange system with an annular array of longitudinal, or spiral passages on the working fluid system side, where the fluid is propelled by the motion of the displacer/regenerator.
3. Longitudinal passages, as above, in which a separate core is inserted to force flow to the outer wall.
4. A high hot-strength structure composed of laminations of Monel or refractory metal to create a thermally conductive pressure vessel with extended surfaces.
5. Laminations or washer-like fins forming the hot-end exchanger where the shape and alignment of the extending surfaces are chosen to maximise penetration into, and heat exchange with, the turbulent combustion gases.
6. A highly conductive inner core used in the pressure vessel to ensure sealing and to contain longitudinal slots or holes for heat exchange passages as per 2 above.
7. The use of metal foil in the core of a regenerator where the metal has been periodically fractured across the direction of flow and passed through rolls to flatten it prior to dimpling and winding into a scroll for the purposes of reducing heat conductivity and enhancing turbulence in the contacting medium.
8. The use of check valves at each end of the regenerator to short circuit, or bypass, the heat transfer surfaces during the portion of the cycle when they would be counterproductive to both the thermodynamic cycle and the pumping power required of the engine.
9. The use of a central tie-rod of high-hot strength and poor thermal conductivity material to restrain the pressure induced axial forces within the thermodynamic pressure vessel.
10. The use of bypass ports and centering springs on the slave regenerator drive cylinder, to arrest the regenerator at the end-of-stroke position and correct errors in motion due to small and continuing leakages of fluid.
11. The use of a refill port on the master cylinder of the regenerator drive system to replenish leakage at bottom-dead-centre on the hydraulic fluid side of the isolating diaphragm.
12. The fixed linkage of the regenerator motion to the crankshaft of the pump/motor by means of fixed gearing, to ensure synchrony between cylinder enabling events and thermodynamic cycle phase.
13. The use of an autonomous temperature control system to maintain a constant temperature at the hot-end of the thermodynamic pressure vessel despite changes in heat flow and power output.
14. The use of a look-up table to create a fixed flow function in the fluid-power machine and consequently produce a controlled thermodynamic cycle with an almost constant and sustained upper pressure limit during the power stroke to minimise creep in the hot-end material whilst maximising power conversion.
15. The offsetting of the virtual power piston, by changing the working volume in increments of a single cylinder's displacement, to control engine power on a cycle by cycle basis.
16. The control of the engine,s cycle at each offset position through the use of a different, or at least a modified, look-up table for controlling the cylinder enabling record of the fluid-power machine.
17. The use of transition look-up tables to allow the engine to smoothly transfer between different power states so that the transitional cycle produces useful power whilst returning the virtual power piston to the correct position at the commencement of the following cycle.
18. The use of pressure and regenerator/displacer position feedback to correct for any slippage in the virtual power piston position through the insertion of a corrective section in the look-up table, where pre-programmed events can be replaced by ones created by the controller as a result of error feedback.
19. The use of buffering, through regenerative power transfer to a gas accumulator from an isolated service of the fluid-power machine, to achieve very fast mechanical response to changes in engine power demand.

What is claimed is:

1. An external combustion engine (1) comprising pressure vessel means defining a tubular working chamber (3) having spaced apart first and second ends and including first wall means (11) adjacent said first end of the chamber and second wall means (6) adjacent said second end of the chamber, heating means (10, 12) for heating said first wall means (11), cooling means for cooling said second wall means (6), piston means (7) having heat exchanging means (9) and drive means for reciprocating the piston means (7) within the tubular working chamber (3) between said first and second ends of the chamber so that the working fluid passes through said heat exchanging means (9), characterised in that said first wall means (11) has first heat exchange surface means (11*d*) and in that said piston means (7) has valving means including first valve means (20) positionable for directing the working fluid, after passage through said heat exchanging means (9), to flow over said first heat exchange surface means (11*d*) when the piston means (7) is moving towards said second end of the chamber (3) in order to move the working fluid from the second end to the first end of said chamber and to by-pass said first heat exchange surface means (11*d*) when the piston means (7) is moving towards said first end of the chamber (3) in order to move the working fluid from the first end to the second end of said chamber (3).

2. An external combustion engine according to claim 1, characterised in that said piston means (7) has a tubular member (40) spaced from walls of the tubular chamber (3) and arranged at the end of the piston means positioned closer to said second end of the chamber, in that the second wall means (6) has second heat exchange surface means (6*a*) and in that said valving means includes second valve means (21) operable either to direct the working fluid outwardly of said tubular member (40) after passage through said heat exchanging means (9) so as to flow over said second heat exchange surface means (6*a*) when the piston means (7) is moving from said second end towards said first end of the chamber (3) or to direct the working fluid through the inside of said tubular member (40) out of contact with said second heat exchange surface means (6*a*) when the piston means (7) is moving from said first end towards said second end of the chamber (3).

3. An external combustion engine according to claim 1, characterised in that said first heat exchange surface means comprises passages (11*d*) formed in said first wall means (11).

4. An external combustion engine according to claim 3, characterised in that said passages are of small bore.

5. An external combustion engine according to claim 3, characterised in that rods are positioned within said passages.

6. An external combustion engine according to claim 3, characterised in that each of said passages has a cross-section of an extreme aspect ratio.

7. An external combustion engine according to claim 3, characterised in that said passages are arranged generally longitudinally in said first wall means.

8. An external combustion engine according to claim 3, characterised in that said passages are arranged to provide a plurality of passes for the working fluid within the wall means.

9. An external combustion engine according to claim 3, characterised in that said passages are arranged generally helically in said first wall means.

10. An external combustion engine according to claim 1, characterised in that said first wall means (11) has outer heat exchange surfaces (11*c*; 112, 113) for heat exchange with combustion gases of said heating means (10, 12).

11. An external combustion engine according to claim 10, characterised in that said outer heat exchange surfaces are provided by heat exchanging fins (11*c*; 112, 113).

12. An external combustion engine according to claim 10, characterised in that said heat exchanging fins (112, 113) are non-circular in shape.

13. An external combustion engine according to claim 10, characterised in that said outer heat exchange surfaces are formed from a stack of heat exchange members (112, 113) assembled together.

14. An external combustion engine according to claim 12, characterised in that adjacent ones of said non-circular heat exchanging fins (112, 113) are staggered relative to each other.

15. An external combustion engine according to claim 10, characterised in that said first wall means (11) comprises a material selected from an alloy of copper, nickel and small amounts of iron, manganese, silicon and carbon; and a refractory metal.

16. An external combustion engine according to claim 1, characterised in that said heat exchanging means (9) comprises metal foil.

17. An external combustion engine according to claim 16, characterised in that said metal foil is arranged in a generally helical coil with an axis coaxial with that of the chamber (3).

18. An external combustion engine according to claim 16, characterised in that said metal foil has a plurality of cuts or openings therein.

19. An external combustion engine according to claim 1, characterised in that a stationary tie rod (8) is arranged coaxially in and along the length of said tubular working chamber (3) and in that the piston means (7) sealably surrounds, and is movable along the length of, the tie means when reciprocated between the ends of said chamber (3).

20. An external combustion engine (1) comprising pressure vessel means defining a tubular working chamber (3) having spaced apart first and second ends and including first wall means (11) adjacent said first end of the chamber and second wall means (6) adjacent said second end of the chamber, heating means (10, 12) for heating said first wall means (11), cooling means for cooling said second wall means (6), piston means (7) having heat exchanging means (9) and drive means for reciprocating the piston means (7) within the tubular working chamber (3) between said first and second ends of the chamber so that the working fluid passes through said heat exchanging means (9), characterised in that said heat exchanging means comprises metal foil having a plurality of cuts or openings therein.

21. An external combustion engine according to claim 20, characterised in that said metal foil is arranged in a generally helical coil with an axis coaxial with that of the tubular working chamber (3).

22. A heat engine system comprising an external combustion engine according to claim 1 in combination with a fluid power machine for creating a controllable variable volume in the working chamber of the engine.

23. An external combustion engine according to claim 15, wherein said refractory metal comprises molybdenum.

24. An external combustion engine according to claim 15, wherein said refractory metal comprises tungsten.

25. A heat engine system according to claim 22, wherein said fluid power machine comprises a high speed digitally controlled fluid working machine.

* * * * *

UNITED STATES PATENT AND TRADEMARK OFFICE

CERTIFICATE OF CORRECTION

PATENT NO. : 6,606,849 B1
DATED : August 19, 2003
INVENTOR(S) : Salter et al.

It is certified that error appears in the above-identified patent and that said Letters Patent is hereby corrected as shown below:

Column 3,
Lines 17 and 19, "lid" should be -- 11d --;

Column 5,
Line 5, after "open check", delete "35,".

Signed and Sealed this

Thirteenth Day of January, 2004

JON W. DUDAS
*Acting Director of the United States Patent and Trademark Office*